United States Patent
Airaksinen

(10) Patent No.: US 6,208,728 B1
(45) Date of Patent: Mar. 27, 2001

(54) CALL WAITING IN CALL SETUP

(75) Inventor: Jukka Airaksinen, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/408,345

(22) Filed: Sep. 29, 1999

Related U.S. Application Data

(63) Continuation of application No. PCT/FI98/00320, filed on Apr. 9, 1998.

(30) Foreign Application Priority Data

Apr. 14, 1997 (FI) ........................................ 971571

(51) Int. Cl.[7] ........................... H04M 3/58; H04M 11/00; H04J 3/12

(52) U.S. Cl. ...................... 379/215; 379/93.35; 370/524

(58) Field of Search ................. 379/88.19, 88.2, 379/88.21, 93.35, 127, 142, 215; 370/522, 524

(56) References Cited

U.S. PATENT DOCUMENTS

| | | | |
|---|---|---|---|
| 4,942,601 | 7/1990 | Park | 379/215 |
| 4,947,421 | 8/1990 | Toy et al. | 379/215 X |
| 5,636,269 * | 6/1997 | Eisdorfer | 379/215 |

FOREIGN PATENT DOCUMENTS

| | | |
|---|---|---|
| 0 692 901 | 1/1996 | (EP) . |
| 2 313 735 | 12/1997 | (GB) . |
| 97/01917 | 1/1997 | (WO) . |

* cited by examiner

*Primary Examiner*—Harry S. Hong
(74) *Attorney, Agent, or Firm*—Altera Law Group LLC

(57) ABSTRACT

The invention relates to call waiting started by a calling subscriber (subscriber A) on the busy line of a called subscriber (subscriber B). The calling subscriber starts the call setup to the called subscriber, whereby a call setup message is sent to the called subscriber. According to the invention, the call waiting method is characterized in that such a call waiting setting is set for the call to be set up with which call waiting is activated and a call priority value is set which expresses the urgency of the call, and the said call waiting setting and the said priority value are relayed to the called subscriber in connection with the call setup.

8 Claims, 3 Drawing Sheets

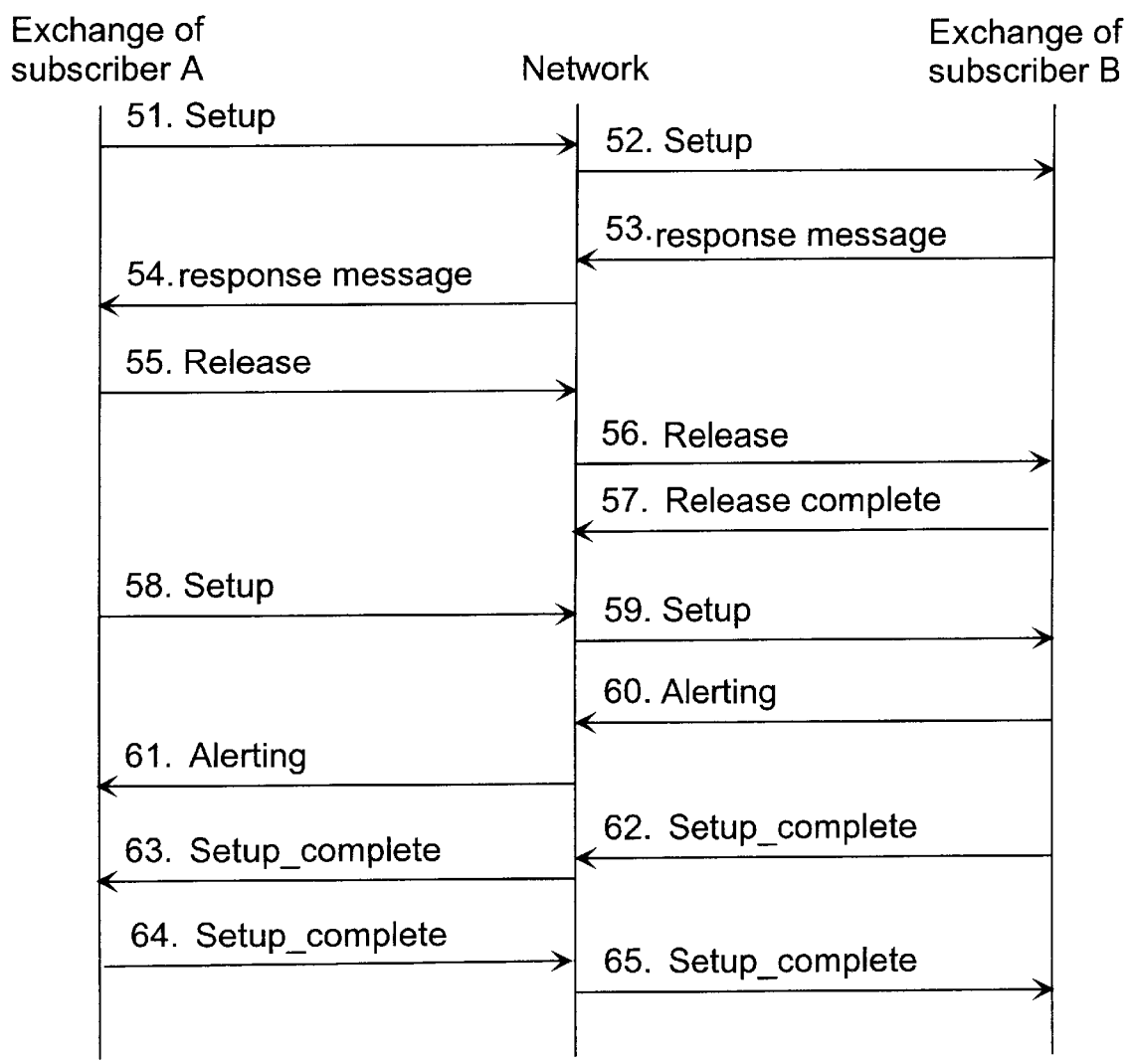

CALL WAITING IN CALL SETUP

This is a continuation of PCT/FI98/00320 filed Apr. 9, 1998.

FIELD OF THE INVENTION

This invention relates to such call waiting in call setup which is started by subscriber A when the line of subscriber B is busy.

BACKGROUND OF THE INVENTION

FIG. 1 in the enclosed drawing shows call setup signalling in an analog telephone network. Subscriber A who is making the call (the calling subscriber) expresses his wish to start the call e.g. by lifting the receiver of his terminal equipment and by entering the telephone number of the other party of the call, that is, subscriber B (the called subscriber). The exchange of subscriber A hereby sends a Setup message (messages 11 and 12) to the exchange of subscriber B over the network in order to announce the incoming call. In the network this message is called an Initial Address Message (IAM).

When subscriber B's terminal equipment alerts, an Alerting message 13 is sent to the network which announces the alerting function. The Alerting message 14 is relayed to the exchange of subscriber A from which the sound of the alerting function is relayed further to subscriber A. If subscriber B is already busy with another call when the new call arrives, the new call will bring about a call waiting signal sound in the ongoing call, if subscriber B has activated the call waiting function. When subscriber B answers the incorming call, a Setup_complete message 15 will be sent to the network and a Setup complete message 16 further to the exchange of subscriber A to indicate setup of the connection. The exchange of subscriber A acknowledges the setup of subscriber B's connection with a Setup_complete message 17.

The acknowledgement is relayed further to subscriber B's exchange with a Setup_complete message 18.

FIG. 2 in the enclosed drawing correspondingly shows call setup signalling in an ISDN network, when there are three pieces of terminal equipment TE1, TE2 and TE3 in the extension of subscriber B. Subscriber A who starts the call sends a Setup message 21 to the exchange of subscriber A which will send a starting message over the network to the exchange of subscriber B. The exchange of subscriber B sends a Setup message 22 to subscriber B's all terminal equipment. In the example shown in FIG. 2, subscriber B's terminal equipment TE3 is busy and the call waiting function is not activated therein, so terminal equipment TE3 sends a Release complete message 23 to the network to indicate non-acceptance of the call setup. Terminal equipment TE1 and TE2 send Alerting messages 24 and 25 to the network to indicate alerting of the terminal equipment. If terminal equipment TE1 and TE2 are also busy when the new call arrives, then call waiting will be performed on the line, provided that the call waiting function has been activated for the two terminal equipment. To indicate the alerting/call waiting in subscriber B's terminal equipment an Alerting message 26 is sent to subscriber A, whereby subscriber A will hear the outgoing sound (alerting sound) of the ring. In the example shown in FIG. 2, terminal equipment TEI answers the incoming call and sends a Connect message 27 to the network.

The call waiting function ends at the same time. Information on subscriber B's answering is relayed further to subscriber A in the Connect message 28. The exchange of subscriber A acknowledges the setup of subscriber B's connection with Connect_acknowledge messages 29 and 30.

It is a problem with known call setups that when subscriber B's line is busy, subscriber A may perform call waiting only if subscriber B has activated the call waiting function. When subscriber B has activated the call waiting function, the call waiting is similar for all incoming calls irrespectively of the urgency of the call. Subscriber A may express the urgency of his matter only by waiting with the call waiting function on until subscriber B picks up the incoming call.

BRIEF DESCRIPTION OF THE INVENTION

It is a purpose of the present invention to allow call waiting started by subscriber A and especially establishment of the priority of an incoming call and announcement of the same to subscriber B.

These objectives are achieved with such a method of call waiting in call setup according to the invention wherein the calling subscriber starts setup of the call to the called subscriber. In the call setup the called subscriber's line is busy and in the method of call waiting a call setup message is sent to the called subscriber. The method according to the invention is characterised in that such a call waiting setting is set therein for the call to be set up with which the call waiting is activated, and a call priority value is set therein which indicates the urgency of the call, and in connection with the call setup the said call waiting setting and the said priority value are relayed to the called subscriber.

The invention is based on the idea of relaying to subscriber B the identifier of the call waiting started by subscriber A and the priority value indicating the urgency of the call, based on which call waiting is performed on subscriber B's line when this is busy and the priority of the incoming call is announced to subscriber B when subscriber B has not set any barring of performance of the call waiting started by subscriber A.

It is an advantage of this kind of call waiting method that subscriber A may start the call waiting even if subscriber B has not activated the call waiting function.

It is another advantage of the call waiting method according to the invention that subscriber B will get to know the urgency of the matter in the caller's mind and can make a decision on acceptance of the call based on this information.

LIST OF FIGURES

The invention will now be described in greater detail in connection with preferable embodiments and referring to the examples shown in FIGS. 1–4 in the enclosed drawings, wherein:

FIG. 4 shows the call waiting method according to the invention in call setup signalling in an analog network.

DETAILED DESCRIPTION OF THE INVENTION

The invention will be described more closely in the following in the light of a preferred embodiment of the invention and referring to FIG. 2.

Figure 2:
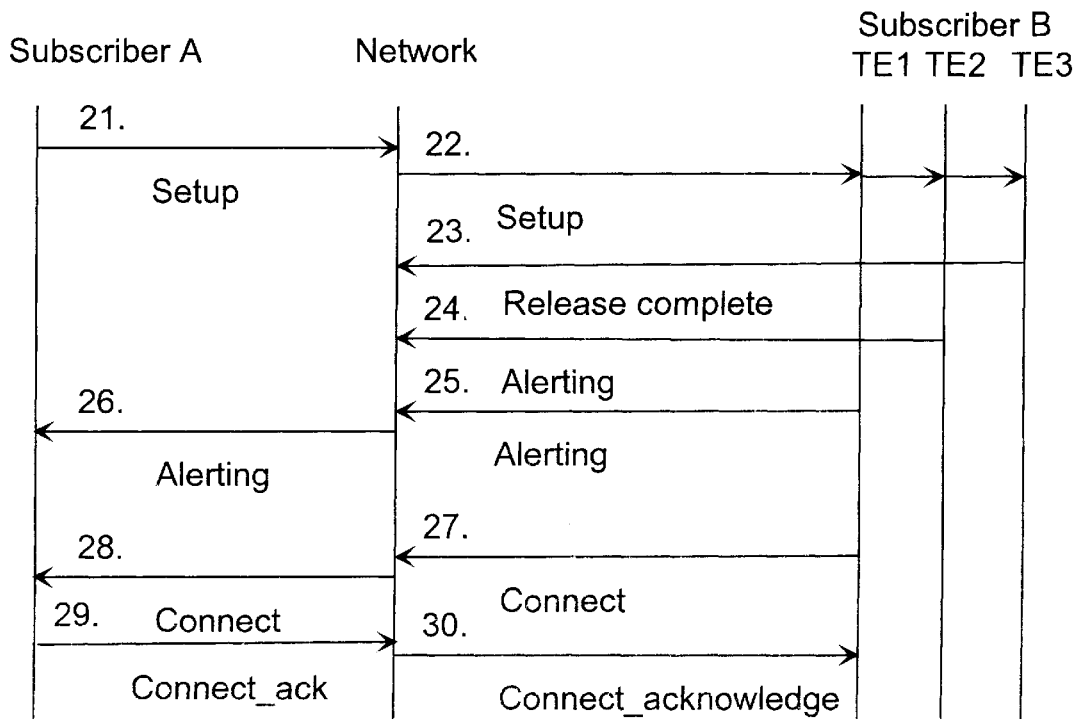
FIG. 2 shows call setup in an ISDN network as a signalling diagram.

FIG. 2 is a signalling diagram of the call setup signalling in an ISDN network which was described above. According to the present invention, in a call setup such a call waiting setting according to the invention is relayed from subscriber A to subscriber B by which the call waiting started by subscriber A is activated, along with a call priority value indicating the urgency of the call. The terminal equipment of subscriber A preferably inserts the call waiting setting and the call priority value in the Setup message 21 sent to the network. The call waiting setting and the call priority value can be pre-set as default settings e.g. in subscriber A's subscriber information, from which they are read and inserted in the Setup message 21 during the call setup. Subscriber A may also enter the call waiting setting and the priority value when starting the call e.g. from the keyboard of his terminal equipment e.g. by entering the code *xx1#, when a priority value of 1 is set for the call, or by entering the code *xx5#, when a priority value of 5 is set for the call. Based on the urgency of his matter, subscriber A chooses a priority value suitable for the call. For example, for subscribers under a company exchange, a priority value suitable for each subscriber may be pre-set as a default setting. If e.g. in the subscriber information of subscriber A default settings according to the invention are pre-set for use in call setup, then subscriber A when starting a call may bypass these default settings by entering new values for the parameters according to the invention. The call waiting setting and the priority value are relayed in ISDN network signalling to subscriber B's exchange and thence further in Setup message 22 to subscriber B. When subscriber B's all terminal equipment TE1, TE2 and TE3 are busy, then in the case shown in FIG. 2 call waiting is set up with the settings according to the invention in the ongoing call in the terminal equipment TE1 and TE2, when subscriber A wishes to use the call waiting function, even if no state-of-the-art call waiting function is established for terminal equipment TE1 and TE2. Call waiting and the priority value according to the invention as set by subscriber A are relayed to terminal equipment TE1 and TE2 of subscriber B e.g. as a signal sound, as verbal information and/or as a text message displayed on the terminal equipment display. The terminal equipment TE1 and TE2 implementing call waiting according to the invention will send Alerting messages 24 and 25 to the network. The call setup is continued for terminal equipment TE1 and TE2 in a state-of-the-art fashion. In a state-of-the-art fashion subscriber B may e.g. stop an ongoing call and answer an incoming call, set up an enquiring call for answering the incoming call, start a negotiation between three parties or continue the ongoing call without answering the incoming call. In the case shown in FIG. 2, barring is established of call waiting according to the invention for preventing call waiting in terminal equipment TE3. Barring of call waiting may be established e.g. in the terminal equipment, whereby in the case shown in FIG. 2 terminal equipment TE3 sends a Release_complete message 23 to the network for non-acceptance of the call setup. If the barring parameter preventing call waiting is set e.g. in the subscriber information of subscriber B, then the call setup will be interrupted already in the exchange of subscriber B. Hereby the exchange of subscriber B will send a Release_complete message to the network for non-acceptance of the call setup.

Figure 1:
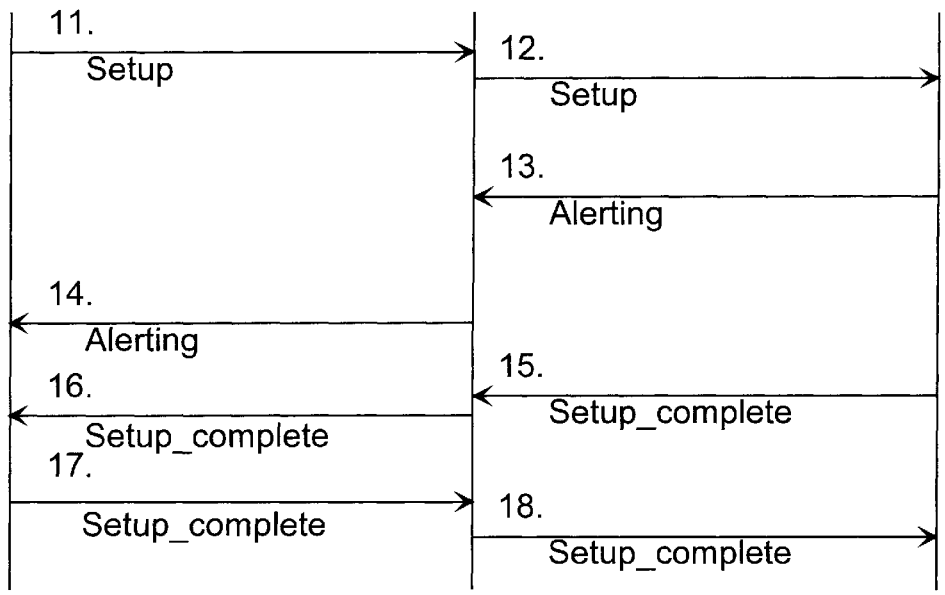
FIG. 1 shows call setup in an analog network as a signalling diagram.

Correspondingly, as was presented in connection with the description of FIG. 2, the call waiting setting and the priority value according to the invention are relayed in the call setup signalling of an analog network shown in FIG. 1 in the Setup message 11 from subscriber A's exchange to the net-. work and in Setup message 12 from the network to the exchange of subscriber B. In the case shown in FIG. 1, subscriber B has not set any barring of call waiting started by subscriber A, so the call waiting according to the invention is performed into the ongoing call and the priority value is announced to subscriber B, even if no state-of-the-art call waiting function is activated for subscriber B. In a state-of-the-art fashion, Alerting messages 13 and 14 are used for relaying alerting function sound to the network and thence further to subscriber A. The call setup is continued in a state-of-the-art fashion as described above.

Figure 3:
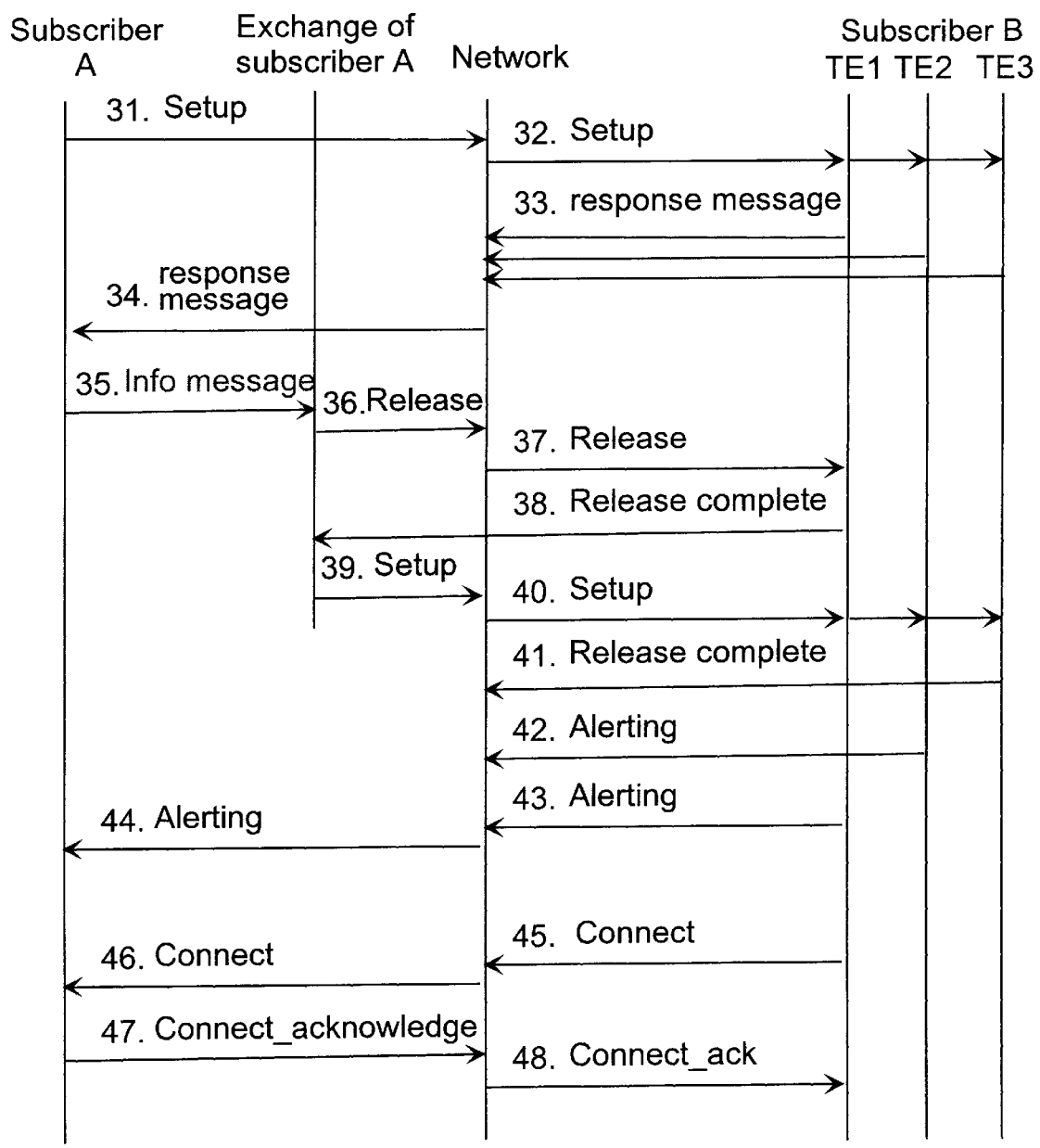
FIG. 3 shows the call waiting method according to the invention in call setup signalling in an ISDN network.

FIG. 3 shows a secondary embodiment of the invention of call setup signalling in an ISDN network. In the secondary embodiment of the invention, the call waiting setting and the priority value according to the invention are changed after the call setup has been started. In FIG. 3, subscriber A in a state-of-the-art fashion sends a Setup message 31 to the network, from which a Setup message 32 is sent further to subscriber B. In the case shown in FIG. 3, the pieces of terminal equipment TE1, TE2 and TE3 of subscriber B are busy and the busy information is sent to subscriber A's exchange in response messages 33 and 34, which are e.g. Release_complete messages or Alerting messages. According to the present invention, subscriber A may enter a call waiting setting and a priority value according to the invention e.g. from the keyboard of his terminal equipment. The call waiting setting and the priority value are relayed from the terminal equipment to subscriber A's exchange e.g. as a function identifier relayed functionally in one message or in a keypad information element as a selection set with the terminal equipment, which is e.g. in the form *xxx#. The choice is relayed to subscriber A's exchange in normal information messages 35. Changing of the all waiting setting and of the priority value requires re-setup of the call, because of the wish to change the starting information of the call. The earlier all setup connection is released with state-of-the-art Release messages 36 and 37 from the exchange of subscriber A through the network to subscriber B and with a Release_complete message 38 from subscriber B to the network. According to the invention, the call waiting setting and priority value stated by subscriber A in the information message/information messages are inserted in the new Setup message 39 which is sent from subscriber A's exchange, -and the call waiting setting and priority value are relayed further to subscriber B in Setup message 40. Correspondingly, as was described above in connection with the preferred embodiment, in an ongoing call in terminal equipment TE1 and TE2 settings according to the invention are used for setting the call waiting and for stating the priority value e.g. as a signal sound, as verbal information or as a text message shown on the terminal equipment display. The terminal equipment TE1 and TE2 will send Alerting messages 42 and 43 to the network and the alerting/call waiting information relayed by these will be sent further to subscriber A in Alerting message 44. In FIG. 3, barring of the call waiting started by subscriber A according to the invention is established in terminal equipment TE3, so terminal equipment TE3 will send a Release complete message 41 to the network to indicate non-acceptance of the call setup. The call setup is continued in a state-of-the-art fashion.

In the secondary embodiment of the invention described above in the light of FIG. 3, the Setup messages 31 and 32 may also according to the invention be connected to the call waiting setting and priority value entered by subscriber A or read from default settings in a similar way as has been described above in connection with the preferred embodiment of the invention. Subscriber A hereby states in the information message/information messages that he is entering new values according to the invention, whereby the call setup connection which has been set up will be released and new Setup messages 39 and 40 will be sent, as was described above.

FIG. 4 shows call setup signalling in an analog network according to a secondary embodiment of the invention. In the manner described above in connection with the description of FIG. 3, the exchange of subscriber A sends the Setup messages 51 and 52 of FIG. 4 in a state-of-the-art fashion or provided with call waiting setting and priority value according to the invention. When the line of subscriber B is busy, the exchange of subscriber B will send busy line information to the network in response message 53. According to the present invention, subscriber A will enter a new call waiting setting and a new priority value e.g. from the keyboard of his terminal equipment. The call waiting setting and priority value are transferred to subscriber A's exchange as an additional selection, e.g. in the form R *xxx* or R *xxx#. The additional selection, that is, changing of the call waiting setting and of the priority value, will bring about a release of the earlier call setup through Release messages 55 and 56 from the exchange of subscriber A over the network to the exchange of subscriber B and through a Release complete acknowledgement message 57 from subscriber B's exchange to the network. In accordance with the invention, the new Setup message 58 to be sent from the exchange of subscriber A is provided with the call waiting setting and priority value which are stated by subscriber A as an additional selection and which are relayed further to the exchange of subscriber B in Setup message 59. Call waiting is inserted in the ongoing call of subscriber B and the call priority value set by subscriber A is made known to subscriber B. The call setup is continued in a state-of-the-art fashion.

The priority value to be relayed to the terminal equipment of subscriber B may be expressed in many different ways. Expression of a priority value relayed as a signal sound may be implemented e.g. as a signal sound repetition frequency e.g. so that priority value 1 brings about the call waiting sound at intervals of half a second and priority value 5 brings about a call waiting sound at intervals of 10 ms, or as an acoustic sound frequency of the signal sound. Such brief verbal information may also be inserted superimposed on an ongoing call which announces the incoming call and states the priority value e.g. as a numerical value or as verbal information indicating the degree of urgency. Terminal equipment equipped with a display may be supplied with a text message announcing the incoming call and its priority value e.g. as a numerical value or as an expression of the degree of urgency. Expression of the call waiting according to the invention may also be implemented suitably by combining a signal sound, a verbal message and/or a text message, e.g. as a call waiting sound on the line and as a text message expressing the priority.

Settings related to implementation of the present invention may be saved in the subscriber information of subscriber A and subscriber B. When desired, default values for the call waiting setting and for the priority value are stored in the subscriber information. In connection with a call setup started by a subscriber, stored default values are read as intended for insertion in the Setup message, if subscriber A has not entered any replacing information for the individual call. A parameter indicating whether the subscriber has the right to set call waiting started by subscriber A may also be set up in the subscriber information. This parameter may be used for limiting the right to start the functionality according to the invention to some subscribers only. If required, to prevent performance of call waiting started by subscriber A, such a barring parameter may be set up in the subscriber information, which may be used for preventing implementation of the functionality according to the invention in the terminal equipment of subscriber B. If barring of call waiting started by subscriber A is established for subscriber B of the call setup, a Release complete message will be sent from subscriber B to the network. Hereby no call waiting will be connected to subscriber B's ongoing call and no priority value will be relayed to subscriber B.

The call waiting started by subscriber A according to the invention is unnecessary as regards the call waiting setting, if a state-of-the-art call waiting functionality has been activated for subscriber B. According to the present invention, subscriber B will hereby be notified of the priority value set by subscriber A and call waiting will be performed on subscriber B's busy line in a state-of-the-art fashion in other respects.

The drawings and the related explanation are only intended to illustrate the inventive idea. The call waiting in call setup according to the invention may vary as regards its details within the scope defined in the claims.

Although the invention is explained above mainly in connection with a fixed telephone network, the call waiting function may be used also in other telephone networks, e.g. in mobile communications networks.

What is claimed is:

1. Method of call waiting in call setup, wherein a calling subscriber starts setup of a call to a called subscriber and wherein the called subscribers line is busy, in which method a call setup message is sent to the called subscriber, wherein on the side of the calling subscriber starting the call setup, the method comprising:

setting a call waiting setting for the call to be set up wherein the call waiting is activated, setting a call priority value which expresses the urgency of the call, and relaying the call waiting setting and the priority value to the called subscriber in connection with the call setup.

2. Method according to claim 1, wherein call waiting is performed on the busy line of the called subscriber, and the priority value of the call is announced to the called subscriber.

3. Method according to claim 1, wherein subscriber barring of performance is set for call waiting started by the calling subscriber, further comprises:

call waiting is performed on the busy line of the called subscriber when no barring of call waiting started by the calling subscriber is set for the subscriber in question, and the priority value of the call is announced to the called subscriber when call waiting is performed on the line.

4. Method according to claim 2, wherein the said priority value is announced to the called subscriber as a signal sound.

5. Method according to claim 2, wherein the said priority value is announced to the called subscriber as verbal information.

6. Method according to claim 2, wherein the said priority value is announced to the called subscriber as a text message shown on the terminal equipment display.

7. Method according to claim 1, wherein the call waiting setting and the priority value are inserted in the call setup signalling.

8. Method according to claim 7, wherein the call waiting setting and the priority value are inserted in the starting message of the call setup.

* * * * *